(12) United States Patent
Zouzal et al.

(10) Patent No.: US 9,758,079 B2
(45) Date of Patent: Sep. 12, 2017

(54) ADJUSTABLE SEAT ASSEMBLY

(71) Applicants: Lear Corporation, Southfield, MI (US); Winsen C. Zouzal, Detroit, MI (US)

(72) Inventors: Winsen C. Zouzal, Detroit, MI (US); Ashford Allen Galbreath, Troy, MI (US); Aisha Enid Johnson, Franklin, MI (US); Gerald Patrick, Shelby Township, MI (US); Michelle A. Pereny, Farmington Hills, MI (US)

(73) Assignee: LEAR CORPORATION, Southfield, MI (US)

( * ) Notice: Subject to any disclaimer, the term of this patent is extended or adjusted under 35 U.S.C. 154(b) by 5 days.

(21) Appl. No.: 14/878,719

(22) Filed: Oct. 8, 2015

(65) Prior Publication Data

US 2017/0101042 A1   Apr. 13, 2017

(51) Int. Cl.
*B60N 2/66* (2006.01)
*B60N 2/02* (2006.01)
*B60N 2/00* (2006.01)
*B60N 2/44* (2006.01)

(52) U.S. Cl.
CPC ............. *B60N 2/665* (2015.04); *B60N 2/002* (2013.01); *B60N 2/0244* (2013.01); *B60N 2/66* (2013.01); *B60N 2/4415* (2013.01); *B60N 2002/0268* (2013.01)

(58) Field of Classification Search
CPC .......... B60N 2/665; B60N 2/66; B60N 2/002; B60N 2/0244; B60N 2002/0268
See application file for complete search history.

(56) References Cited

U.S. PATENT DOCUMENTS

| | | | |
|---|---|---|---|
| 5,758,924 A | 6/1998 | Vishey | |
| 6,098,000 A | 8/2000 | Long et al. | |
| 6,273,810 B1 * | 8/2001 | Rhodes, Jr. | B60N 2/4415 297/180.13 |
| 6,348,663 B1 * | 2/2002 | Schoos | B60N 2/002 701/45 |
| 6,398,303 B1 | 6/2002 | Herrmann et al. | |
| 6,559,422 B2 | 5/2003 | Burt | |
| 6,682,059 B1 | 1/2004 | Daniels et al. | |
| 7,609,168 B2 * | 10/2009 | Boverie | B60N 2/002 180/273 |
| 7,621,596 B2 | 11/2009 | Petzel | |
| 7,704,217 B2 * | 4/2010 | Morrison | A47C 4/54 601/148 |
| 7,727,171 B2 * | 6/2010 | Ozaki | B60N 2/4415 297/284.3 |
| 8,162,398 B2 * | 4/2012 | Colja | B60N 2/665 297/284.4 |

(Continued)

*Primary Examiner* — Dale W Hilgendorf
(74) *Attorney, Agent, or Firm* — Brooks Kushman P.C.

(57) ABSTRACT

A seat assembly is provided with a seat bottom and a seat back mounted adjacent the bottom. A first actuator is operably connected to the seat back for applying a first pressure to a seated occupant at a first height. A second actuator is laterally offset from the first actuator and operably connected to the seat back for applying a second pressure to the occupant at a second height. The first and second actuators are operable to provide an asymmetric comfort position to the occupant. The asymmetric comfort position may set the first pressure different than the second pressure or set the first height different than the second height.

19 Claims, 3 Drawing Sheets

(56) References Cited

U.S. PATENT DOCUMENTS

| | | |
|---|---|---|
| 8,616,654 B2 | 12/2013 | Zenk et al. |
| 2009/0099490 A1* | 4/2009 | Durt .................. B60N 2/448 297/284.3 |
| 2012/0086249 A1 | 4/2012 | Hotary et al. |

* cited by examiner

ADJUSTABLE SEAT ASSEMBLY

TECHNICAL FIELD

Various embodiments relate to adjustable seat assemblies.

BACKGROUND

An adjustable seat assembly is illustrated and described in U.S. Pat. No. 5,758,924, which issued on Jun. 2, 1998 to Lear Corporation.

SUMMARY

In at least one other aspect, a seat assembly is provided with a seat bottom and a seat back mounted adjacent the seat bottom, the seat back extending generally in an upright direction. A first air bladder assembly is positioned along the seat back for applying a first air pressure to a seated occupant. A second air bladder assembly is laterally offset from the first air bladder assembly along the seat back for applying a second air pressure to the occupant. The first and second air bladders inflate to provide an asymmetric comfort position to the occupant such that the first air pressure and second air pressure are different. A plurality of sensors is operably connected to the seat back to detect a seating position of an occupant. A controller is in electrical communication with the plurality of sensors and the first and second air bladder assemblies. The controller is configured to receive data from the plurality of sensors, compare the data to determine if the occupant is seated in an uneven position. If the occupant is seated in the uneven position, the controller adjusts the first and second actuators independently to an asymmetric comfort position. In the asymmetric comfort position, the first pressure is different than the second pressure or the first height is different than the second height.

In another aspect, the first air pressure is at least twenty percent greater than the second air pressure.

In a further aspect, the first air bladder includes a first valve and the second air bladder includes a second valve. The first valve is operable independent of the second valve so that the first air bladder is inflatable independent of the second air bladder.

In still another aspect, the seat assembly also includes a compressor in fluid communication with the first and second valves for providing air to the first and second bladders.

In yet another aspect, at least one of the sensors is disposed within the controller at a pneumatic fill-line of one of the first and second bladder.

In still another aspect, a seat assembly is provided with a seat bottom and a seat back mounted adjacent the seat bottom and extending generally in an upright direction. A first actuator is operably connected to seat back for applying a first pressure to the occupant at a first height. A second actuator is laterally offset from the first actuator and is operably connected to the seat back for applying a second pressure to the occupant at a second height. A controller is configured to receive input indicating the occupant is seated in an uneven position. If the occupant is seated in an uneven position, the controller adjusts the first and second actuators independently to an asymmetric comfort position such that the first pressure is different than the second pressure or the first height is different than the second height.

In at least one aspect, the seat assembly includes a plurality of sensors operably connected to at least one of the seat bottom and the seat back to detect a seating position of an occupant. A controller is in electrical communication with the plurality of sensors and the first and second actuators. The controller is programmed to receive data from the plurality of sensors, compare the data to determine if the occupant is seated in an uneven position, and adjust the first and second actuators independently to the asymmetric comfort position if the occupant is seated in the uneven position.

In yet another aspect, the plurality of sensors includes at least one right-side sensor and at least one left-side sensor.

In one other aspect, the actuator comprises a plurality of air actuators arranged in an array on a right side of the seat back. The second actuator comprises a plurality of actuators arranged in an array on a left side of the seat back.

In a further aspect, the right-side array is arranged symmetrically to the left-side array about a centerline of the seat back.

In another aspect, the first actuator is oriented on one of a right side and a left side of the seat back and the second actuator is oriented on the other of the right side and the left side of the seat back.

In one other aspect, at least one of the first and second actuators is positioned in a lumbar region of the seat back.

In still another aspect, the first actuator is operable independent of the second actuator.

In another aspect, the seat assembly includes an operator input. The occupant selects the asymmetric comfort position via the operator input.

In a further aspect, the first actuator is decoupled from the second actuator such that the first actuator is operable to have a set a first height different from the second height and set a first pressure different than the second pressure.

In at least one aspect, a method for adjusting a seat assembly is provided. The seat assembly is adjusted by applying a first pressure to a seated occupant at a first height. The seat assembly is also adjusted by applying a second pressure to the occupant at a second height laterally offset from the first height. The second pressure is different than the first pressure or the second height is different than the first height.

In one other aspect, the method includes receiving an input indicative of an asymmetric seated position of an occupant.

BRIEF DESCRIPTION OF THE DRAWINGS

Certain embodiments of the present disclosure are pointed out herein. However, other features of the various embodiments will become more apparent and will be further understood by referring to the following detailed description in conjunction with the accompanying drawings, in which.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except for otherwise expressly indicated, all numerical quantities in this description indicating amounts are to be understood as modified by the word "about" in describing the broader scope of the disclosure. Also, unless expressly stated to the contrary, the description of a group or class of materials as suitable or preferred for a given purpose in connection with the disclosure implies that any two or more members of the group or class may be equally suitable and preferred.

Figure 1:
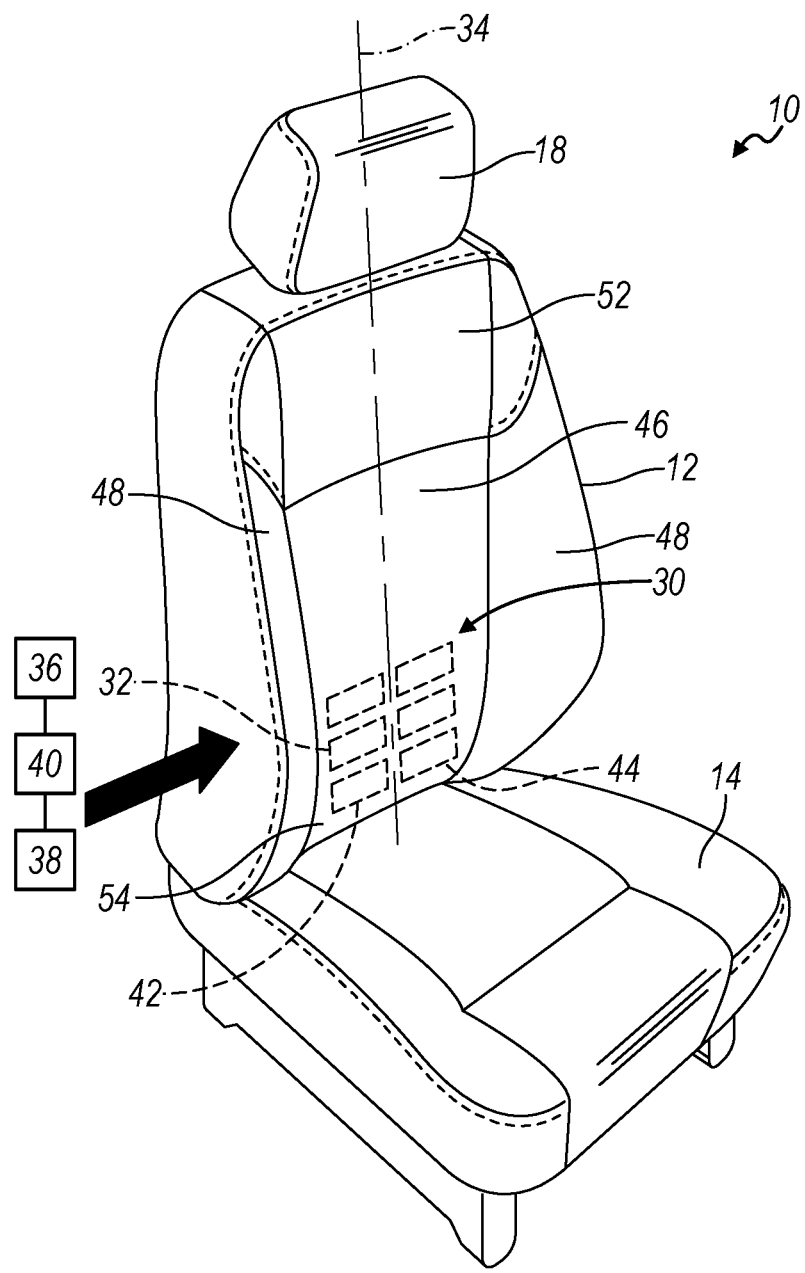
FIG. 1 is a perspective view of an exemplary seat assembly incorporating a moveable comfort system.

Referring now to the Figures, where like numerals are used to designate like structures throughout the drawings, a seat assembly 10 in accordance with at least one embodiment of the present invention is generally shown in FIG. 1. The seat assembly 10 includes a seat back 12 and a seat bottom 14. As shown, the seat back 12 extends generally in the upright direction and is pivotally attached to the seat bottom 14. Each of the seat back 12 and the seat bottom 14 typically include a cushion or padding and a trim cover assembly for decoratively covering and protecting the cushion. Typically, the cushion is made of an expandable foam material and is molded to a desired shape. The seat assembly 10 may also include a head restraint 18 that is adjustable in relation to the seat back 12.

While the seat assembly 10 in FIG. 1 is illustrated as a vehicle seat assembly, it should be understood that the principles of the present application are applicable to other types of seat assemblies, as well as non-vehicle seat assemblies.

Research has shown that uniformity in body pressure distribution, particularly in the lower black, was statistically correlated to local discomfort. Occupants would self-select asymmetrical back support, particularly in the lower back, such as the lumber region. But typical lumbar supports provide even support across the seat back in the lateral direction and cannot provide asymmetric support.

The seat assembly 10 also includes a comfort system 30 that is moveable asymmetrically. The comfort system 30 may include a plurality of actuators 32 that move between an extended position and a retracted position. Each actuator 32 may apply pressure or support to the seated passenger.

As shown, the plurality of actuators 32 may be aligned symmetrically about the centerline 34 of the seat back 10. The actuators 32 may include a plurality of left-side actuators 42 and a plurality of right-side actuators 44.

The actuators 32 may include pneumatic bladders that inflate and deflate to provide various degrees of support to the seated passenger along the seat back 12 or seat bottom 14. The actuators 32 may also include movable knobs or bars. For example, knobs may have a generally semispherical support surfaces, whereas bars maybe have a more planar support surface. However, the actuators 32 may have any contoured shape support surface. The actuators 32 have be formed of a material that has a hardness that is greater than the hardness of the cushion, such as hard plastic or harder foam, in order to provide greater support in the extended position. Further, the actuators 32 that extend and retract using any suitable mechanism known to a person having ordinary skill in the art.

In FIG. 1, the left-side and right-side actuators 42, 44 are positioned along the lumbar region of 54 the seat in order to provide support to the occupant's lower back. The lumbar region 54 of the seat back 12 is located below the upper region 52. The upper region 52 may provide support to the thoracic region of the occupant's spine.

In order to provide an asymmetric comfort position, the left-side actuators 42 are decoupled from the right-side actuators 44. By decoupling the actuators, the left-side actuators 42 are independently controllable from the right-side actuators 44.

Figure 3:
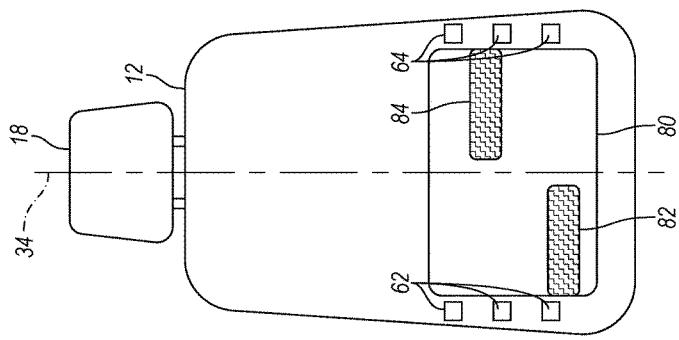
FIG. 3 is a schematic illustration of the moveable comfort systems configured to provide an asymmetric comfort seating position according to one embodiment.
Figure 4:
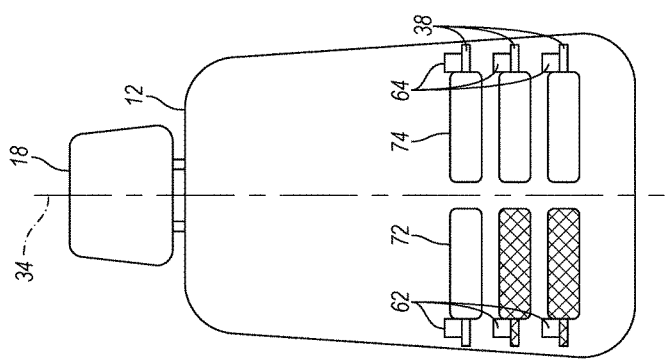
FIG. 4 is a schematic illustration of the moveable comfort systems configured to provide an asymmetric comfort seating position according to another embodiment.

The moveable comfort system 30 may also include a controller 38 for regulating any movement of the actuators 32. In at least one embodiment, as shown in FIGS. 3-4, the actuators 32 include air bladders. For example, in FIGS. 3-4, the moveable comfort system 30 includes left-side air bladders 72 and right-side air bladders 74. In this embodiment, the controller may regulate compressed air into and out of the bladders. By decoupling the air bladders, the left-side air bladders 72 are independently controllable from the right-side actuators 74. For example, a left-side air bladder could be inflated independent of inflating a right-side air bladder.

The moveable comfort system 30 may also include a compressor 36 that provides a source of air to the bladder 72, 74. The compressor 36 and controller 38 may be provided in the seat back 12, the seat bottom 14 or concealed within the vehicle body. The controller 38 may be a multifunction controller that also controls other functions in the vehicle. A plurality of valves 40 receive the compressed air and are controlled by the controller 38 for regulating compressed air into and out of the seat assembly 10. The left-side air bladders 72 and right-side air bladders 74 may each have a common valve bank, or a valve 40 may be provided on each of the air bladders of left and right side 72, 74.

In the illustrated embodiment, the actuators 32 are disposed along a central region 46 between opposing bolster regions 48 of the seat back 12. However, it is contemplated that the actuators 32 may be positioned along any portion of the seat back 12. For example, actuators 32 may also be located along the bolster portions 48 seat back 12.

Each of the left-side actuators 42 and the right-side actuators 44 are illustrated in an array that is aligned laterally and spaced apart in the upright direction. It is also contemplated the plurality of left and right-side actuators 42, 44 may be positioned in other array patterns or configurations. As shown in FIG. 1, the positions of the left-side actuators 42 are symmetric to the positions of the right-side actuators 44 about the centerline 34 of the seat back 12. The centerline 34 is the lateral axis of symmetry of the seat back 12 and extends in the upright direction.

The seat assembly 10 may be arranged in an asymmetric comfort position automatically or through manual inputs selection from the occupant. The occupant may manually set the left-side actuators 42 to apply a different pressure than the right-side actuators 44. The occupant may manually select the asymmetric comfort position through a graphical user interface or inputs such as a button on the seat assembly that is in communication with the controller. By manually selecting the asymmetric comfort position, the user may manually set the left-side actuators 42 to apply a pressure different than the right-side actuators 44.

Figure 2:
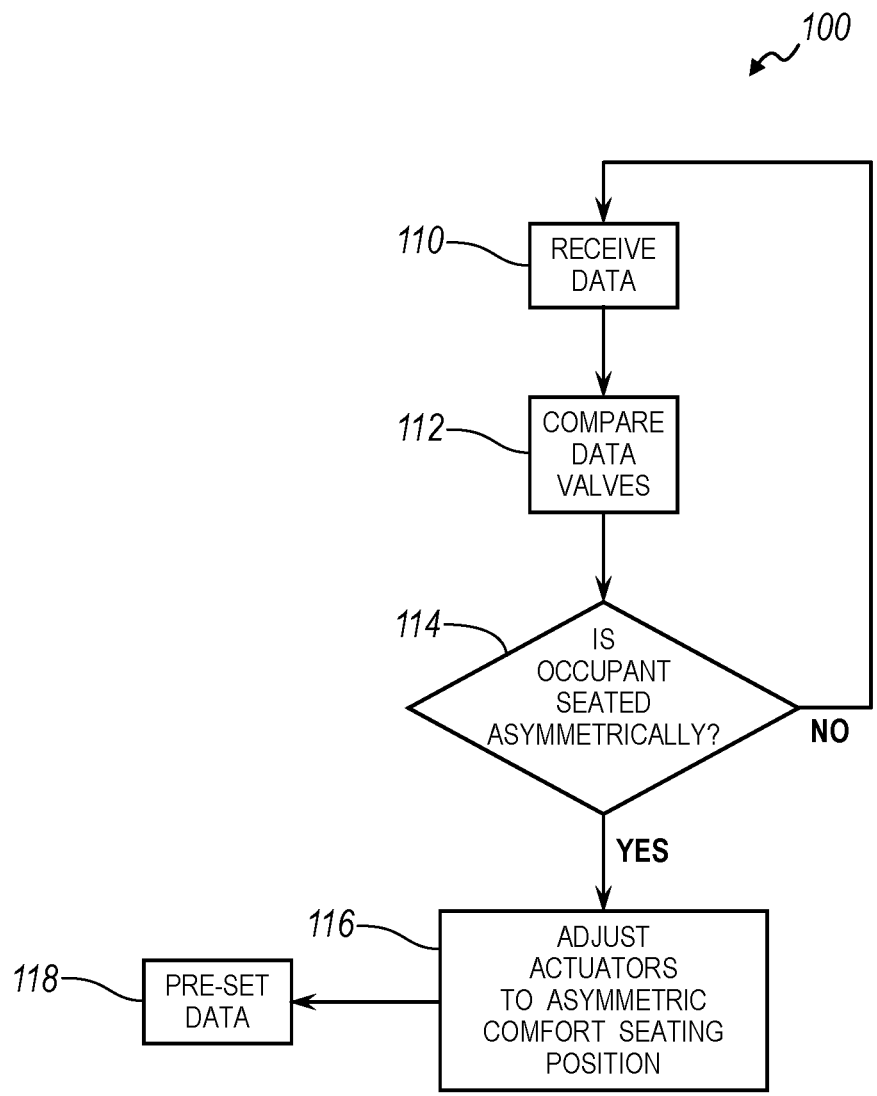
FIG. 2 is a flowchart of a method for adjusting a vehicle seat assembly according to an embodiment.

The controller 38 may also automatically adjust the movable comfort system 30 to set the left-side actuators 42 to apply a different pressure than the right-side actuators 44. FIG. 2 depicts a method 100 for adjusting the seat assembly 10.

The controller 38 collects occupant seating data, as shown in block 110. The data may be based on the status of actuators (such as pressure of inflatable air bladders, status of valves or the like), anthropometric data, body pressure distribution (BPD), or other data that provides a comfort, typical preferred asymmetric lumbar supported posture and biomechanical position of the occupant in the vehicle seat assembly 10. For example, each of the left-side and right-side air bladders 72, 74, may include a pressure sensor 62, 64, respectively, to detect air pressure in each bladder. Any pressure sensor may be used, such as a pneumatic pressure sensor at the outlet valve of each respective air bladder. Pressure can also be sensed by contact pressure sensors disposed in front of or behind some or all of the respective air bladders, including on a front or rear surface thereof. The contact pressure sensors may include pressure-sensing mats, such as those available by Tekscan®, Inc. In another embodiment, the pressure of the bladders 72, 74 may also be measured in pneumatic fill lines (not shown) connected to the bladders 72, 74. The pneumatic fill lines may extend from each bladder to the controller 38 and may connect to the controller 38 at a connection nozzle. The sensors 62, 64 may be located within the controller 38 at the end of the pneumatic fill lines.

In block 112, the controller 38 compares the plurality of sensor values. In block 114, the controller 38 determines that the occupant is seated asymmetrically. In one embodiment, the controller 38 may determine that the occupant is seated asymmetrically if the different in pressures from a left-side sensor 62 is at least twenty-percent different than a corresponding right-side sensor 64. In another embodiment, the controller 38 may determine that the occupant is seated asymmetrically if an average of the left-side sensors 62 differs from an average of the right-side sensors 64. Any suitable method of determining an asymmetric seating position is contemplated based on a difference in the left-side sensors 62 compared to the right-side sensors 64.

If the occupant is seated asymmetrically, the controller 38 set the pressure of the left-side actuators 42 and right-side actuators 44 at different pressures, to accommodate the occupant's asymmetric seating position, as shown in block 116.

The controller 38 may also take into account the pre-set data when setting the pressure of the left-side actuators 42 and right-side actuators 44, as shown in block 118. The controller 38 may also use pre-set data to adjust the comfort system 30, as shown in block 118. Pre-set data may include previous occupant settings of asymmetric seating positions, or pre-set asymmetric seating preferences. Various other pre-set data, such as basic comfort, seated posture and biomechanically optimized seating position recommendations. For example, a touring setting may provide optimal visibility, use of features and controls, and the like. A performance setting may be provided for active drivers to provide a more erect position with firmer seating. Additionally, a luxury setting may be more reclined with softer seating.

If the occupant is seated evenly, the controller 38 may continue to receive data to monitor the occupants seating position. If the occupant shifts to an asymmetric seating position, after a predetermined time, the controller 38 may adjust the actuators 32 to an asymmetric comfort seating position. The controller 38 may apply a new seating position if the occupant shifts or if the occupant manually selects a new position. Otherwise, the controller 38 maintains the asymmetric seating position.

Figure 5:
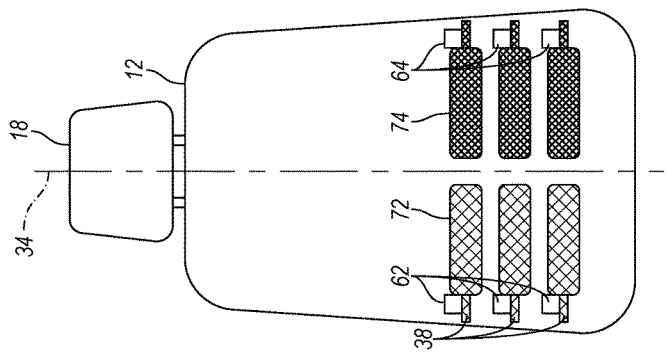
FIG. 5 is a schematic illustration of the moveable comfort systems configured to provide an asymmetric comfort seating position according to one other embodiment.

Examples of asymmetric seating positions are illustrated in FIGS. 3-5. FIGS. 3-4 illustrate embodiments where the left-side and right-side actuators 42, 44 are left and right air bladders 72, 74. Each of the left and right air bladders 72, 74 includes a valve 38 that is independently controllable and decoupled from the other valves. Also, each of the left air bladders 72 includes a left sensor 62, and likewise, each of the right air bladders 74 includes a right sensor 64.

The asymmetric comfort seating position shown in FIG. 3 schematically illustrates the right air bladders 74 are inflated more than the left air bladders 72. While the number of the air bladders on the left and right side 72, 74 may vary, in the embodiment in FIG. 3, all of the right air bladders 74 are inflated to a greater pressure than the left air bladders.

In FIG. 4, the asymmetric comfort seating position illustrates an embodiment where a portion of the left air bladders 72 are inflated more than the right air bladders 74. In fact, the right air bladders 74 are not inflated at all so that only the portion of the left bladders 72 are applying pressure to the occupant.

FIG. 5 illustrates a moveable comfort system 30 that includes a four-way lumbar support system 80. In typical four-way lumbar systems, the actuator is adjustable in the upright direction as well as providing various amounts of support to the occupant in the fore-aft direction. In the embodiment illustrated in FIG. 5, a left lumbar actuator 82 is decoupled from a right lumber actuator 84 and moveable independently. Therefore, the left lumber actuator 82 can apply different pressure than the right lumber actuator 84 through more or less fore-aft travel. The left lumber actuator 82 may also be moveable to a different height than the right lumber actuator 82. In the embodiment in FIG. 5, the left and right lumbar actuators 82, 84 are applying generally the same pressure, but at different heights.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat bottom;
   a seat back mounted adjacent to the seat bottom and extending generally in an upright direction;
   a first air bladder positioned along the seat back for applying a first air pressure to a seated occupant at a first height; and
   a second air bladder laterally offset from the first air bladder along the seat back for applying a second air pressure to an occupant at a second height;
   a plurality of sensors operably connected to at least one of the seat bottom and the seat back to detect a seating position of the occupant;
   a controller in electrical communication with the plurality of sensors and the first and second air bladders, the controller programmed to:
   receive data from the plurality of sensors;
   compare the data to determine if the occupant is seated in an uneven position; and
   adjust the first and second air bladders to an asymmetric comfort position if the occupant is seated in the uneven position such that at least one of (i) the first pressure is different than the second pressure and (ii) the first height is different than the second height.

2. The seat assembly of claim 1 wherein at least one of the first and second air bladders is positioned in a lumbar region of the seat back.

3. The seat assembly of claim 1 wherein:
the first air bladder includes a first valve;
the second air bladder includes a second valve; and
the first valve is operable independent of the second valve so that the first air bladder is inflatable independent of the second air bladder.

4. The seat assembly of claim 1 wherein:
the first air bladder comprises a plurality of air bladders arranged in an array on a right side of the seat back; and
the second air bladder comprises a plurality of air bladders arranged in an array on a left side of the seat back,
wherein right-side array is arranged symmetrically to the left-side array about a centerline of the seat back.

5. The seat assembly of claim 1 further comprising an air compressor in fluid communication with the first and second valves for providing air to the first and second bladders.

6. The seat assembly of claim 5 wherein the first air bladder applies the first air pressure being at least twenty percent greater than the second air pressure.

7. The seat assembly of claim 1 wherein at least one of the plurality of sensors is disposed within the controller at a pneumatic fill-line of one of the first and second bladder.

8. The seat assembly of claim 1 wherein the plurality of sensors comprise:
at least one right-side sensor; and
at least one left-side sensor,
wherein the controller is programmed to:
receive data from the right and left-side sensors;
compare the data to determine if the occupant is seated in a laterally uneven position; and
adjust the first and second actuators independently to laterally asymmetric comfort position if the occupant is seated in the laterally uneven position.

9. A seat assembly comprising:
a seat bottom;
a seat back mounted adjacent to the seat bottom and extending generally in an upright direction;
a first actuator operably connected to the seat back for applying a first pressure to an occupant at a first height;
a second actuator laterally offset from the first actuator and operably connected to the seat back for applying a second pressure to the occupant at a second height;
a plurality of sensors operably connected to at least one of the seat bottom and the seat back to detect a seating position of the occupant
a controller in electrical communication with the plurality of sensors and the first and second actuators and is programmed to:
receive data from the plurality of sensors;
compare the data to determine if the occupant is seated in an uneven position; and
adjust the first and second actuators independently to an asymmetric comfort position if the occupant is seated in the uneven position such that at least one of (i) the first pressure is different than the second pressure and (ii) the first height is different than the second height.

10. The seat assembly of claim 9 further comprising:
at least one right-side sensor; and
at least one left-side sensor,
wherein the controller is in electrical communication with the right and left-side sensors and programmed to:
receive data from the right and left-side sensors;
compare the data to determine if the occupant is seated in a laterally uneven position; and
adjust the first and second actuators independently to the asymmetric comfort position if the occupant is seated in the laterally uneven position.

11. The seat assembly of claim 9 wherein the first actuator comprises at least one first air bladder assembly and the second actuator comprises at least one second air bladder assembly.

12. The seat assembly of claim 9 wherein the first actuator comprises a plurality of actuators arranged in an array on a right side of the seat back; and
the second actuator comprises a plurality of actuators arranged in an array on a left side of the seat back.

13. The seat assembly of claim 9 wherein the first actuator and the second actuator are positioned in a lumbar region of the seat back.

14. The seat assembly of claim 9 wherein the occupant provides the input indicating the asymmetric comfort position desired via an operator input.

15. The seat assembly of claim 9 wherein the first actuator is decoupled from the second actuator such that the first actuator is operable to set the first height different from the second height and set the first pressure different than the second pressure.

16. A method for adjusting a seat assembly comprising:
receiving data from a plurality of sensors operably connected to at least one of a seat bottom and a seat back to detect a seating position of an occupant;
compare the data to determine if the occupant is seated in an asymmetric seated position;
if the occupant is seated in the asymmetric seated position:
applying a first pressure to a seated occupant at a first height; and
applying a second pressure to the occupant at a second height laterally offset from the first height, whereby at least one of (i) the second pressure is different than the first pressure, and (ii) the second height is different than the first height.

17. The method of claim 16 further comprising:
operating a first actuator operably connected to a seat back to apply the first pressure at the first height;
operating a second actuator laterally offset from the first actuator and operably connected to the seat back for applying the second pressure at the second height;
wherein the first actuator is oriented on one of a right side and a left side of the seat back and the second actuator is oriented on the other of the right side and the left side of the seat back.

18. The method of claim 17 wherein the first and second actuators are positioned in a lumbar region of the seat back.

19. The method of claim 16 wherein the asymmetric seated position further comprises a laterally asymmetric seated position.

* * * * *